3,298,952
METHOD FOR RESTORING FRICTION LUBRICATIVE SURFACES OF MACHINE PARTS
Boris Petrovich Grigorjev, Polajrnykh Zorj St. 74, Apt. 8, Murmansk 12, U.S.S.R.
No Drawing. Filed May 21, 1963, Ser. No. 282,106
2 Claims. (Cl. 252—26)

The invention relates to restoring friction lubricative surfaces of machine parts.

I take into account that prior to my invention methods for restoring attrition friction surfaces of machine parts have been known and used as well as powdered addition agents of lead, copper, graphite and other metals utilized in lubricants, a thin film of metal added in the lubricant being formed on friction surfaces of machine parts, and the service life of the lubrication itself becoming longer.

Among the disadvantages of previously known methods is that they require utilization of finely dispersed metal powders.

Another disadvantage of previously known methods is that they do not ensure sufficient adhesion strength of the residual powdered metal particles to the friction surfaces of parts since adhesion strength is due to absorptive interaction.

Although attempts have been made to overcome the above difficulties and disadvantages they did not produce any result, while I have succeeded in solving this task and carried it out practically.

An object of the present invention is to increase wear-resistance of the friction surfaces of machine parts. Another object of the invention is to increase stability and consequently the efficiency of lubricants.

Other objects and advantages of the invention will be clear from the disclosure hereinafter.

In the lower part of a lubricating oil tank a special net contains pieces of sodium-and-tin alloy made as 1:3 weight parts, that is the alloy is made of one sodium weight part and of 3 tin weight parts.

Tin is melted in a metal vessel. Then, metal sodium is quickly introduced into the tin already removed from the hearth, said sodium melting immediately, floating upwards and flashing. At this instant the alloy is energetically stirred by a shovel, so as to lift the lower layers of tin upwards. In ten to fifteen seconds the alloy solidifies, it is placed into a glass vessel and covered with mineral oil.

The alloy is stored in mineral oil. In preparing the alloy preferably no air is admitted or it is prepared under an atmosphere of an inert gas.

Moreover, an iodine strainer is installed on the lubricant pressure system before oil is supplied to the bearings. The strainer is made of a set of split cotton-stitched rings, it is impregnated with iodine vapours and is braced with pinned nuts. An already assembled set is arranged on the housing and is closed with a lid.

In the course of operation of the arrangement oil at a temperature of 40 to 90° is oxidized by the oxygen from the air. Sodium-and-tin alloy reacts with oxidized oil, thus forming free tin cations, since sodium of the alloy reacts with water present in the oxidized lubricant, and the alloy disintegrates. The iodine acts as an accelerator.

The tin cations thus formed are carried by the lubricating oil through a pressure oil system and approach friction surfaces. There, the cations under pressure conditions of an oil wedge and motor operating temperatures, interact with friction surfaces diffusing into the alloy upper layer, thus forming a wear-resistant film. That is, the wear layer of the friction surfaces of machine parts is restored. Practically, friction surfaces are coated with a uniform smooth spongy layer of a soft metal.

Although this invention is disclosed in connection with the preferred embodiment, it will be understood that modifications and other variants are possible without departing from the spirit and scope of the invention, what will be readily understood by those skilled in the art.

Said modifications and variants are considered to be within the idea and the scope of the invention and the appended claims.

What we claim is:
1. A method of extending the service life of friction machine parts and lubricants of machines in operation for improving wear resistance of friction parts and the efficiency of the lubricants, which comprises adding metals and haloids to the lubricants, said metal additions comprising sodium alloyed with tin in the ratio of 1 to 3 parts by weight, said haloid addition comprising iodine as an accelerator and said lubricant oxidizing by reason of temperature conditions arising during machine operation to form free tin cations capable of plating out on lubricated surfaces.

2. A method according to claim 1, wherein the lubricant circulation system includes a batch strainer permeated with the haloid to be added to the lubricant.

References Cited by the Examiner
UNITED STATES PATENTS

| 1,658,173 | 2/1928 | Perks | 252—26 X |
| 1,714,564 | 5/1929 | Koehler | 252—26 X |
| 1,913,953 | 6/1933 | Prendergast et al. | 252—26 X |
| 2,173,100 | 9/1939 | Drapeau et al. | 252—26 X |

DANIEL E. WYMAN, *Primary Examiner.*

P. P. GARVIN, *Assistant Examiner.*